United States Patent
Fukuhara

(10) Patent No.: US 8,189,932 B2
(45) Date of Patent: May 29, 2012

(54) IMAGE PROCESSING APPARATUS AND IMAGE PROCESSING METHOD

(75) Inventor: Takahiro Fukuhara, Kanagawa (JP)

(73) Assignee: Sony Corporation, Tokyo (JP)

( * ) Notice: Subject to any disclaimer, the term of this patent is extended or adjusted under 35 U.S.C. 154(b) by 960 days.

(21) Appl. No.: 11/742,813

(22) Filed: May 1, 2007

(65) Prior Publication Data

US 2007/0286510 A1    Dec. 13, 2007

(30) Foreign Application Priority Data

May 16, 2006  (JP) ................................ 2006-136875

(51) Int. Cl.
*G06K 9/36* (2006.01)
*G06K 9/46* (2006.01)
*G06K 9/00* (2006.01)

(52) U.S. Cl. ........ 382/232; 382/233; 382/240; 382/248; 382/251

(58) Field of Classification Search .................. 382/232, 382/233, 240, 251, 248
See application file for complete search history.

(56) References Cited

U.S. PATENT DOCUMENTS

| | | | |
|---|---|---|---|
| 6,332,043 B1 * | 12/2001 | Ogata ........................... | 382/240 |
| 6,560,369 B1 * | 5/2003 | Sato .............................. | 382/239 |
| 6,658,379 B1 * | 12/2003 | Ogata ........................... | 704/203 |
| 6,788,820 B2 * | 9/2004 | Ammicht et al. ............. | 382/240 |
| 6,973,127 B1 * | 12/2005 | Kolesnik et al. ......... | 375/240.11 |
| 7,016,546 B2 * | 3/2006 | Fukuhara et al. ............. | 382/239 |
| 2002/0048405 A1 * | 4/2002 | Zandi et al. .................... | 382/232 |
| 2002/0168113 A1 * | 11/2002 | Nakayama .................... | 382/240 |
| 2003/0147463 A1 * | 8/2003 | Sato et al. ................ | 375/240.05 |
| 2003/0190082 A1 * | 10/2003 | Ammicht et al. ............. | 382/240 |
| 2004/0141652 A1 * | 7/2004 | Fukuhara et al. ............. | 382/232 |
| 2005/0259880 A1 * | 11/2005 | Fukuhara et al. ............. | 382/240 |
| 2005/0265617 A1 * | 12/2005 | Fukuhara et al. ............. | 382/240 |
| 2006/0053004 A1 * | 3/2006 | Ceperkovic et al. .......... | 704/221 |

FOREIGN PATENT DOCUMENTS

| | | |
|---|---|---|
| JP | 10-28031 | 1/1998 |
| JP | 10-63643 | 3/1998 |
| JP | 11-127439 | 5/1999 |
| JP | 2001-285643 | 10/2001 |
| JP | 2005-150846 | 6/2005 |

OTHER PUBLICATIONS

Chrysafis, C.—"Line based reduced memory, wavelet image compression"—IEEE 1998, pp. 398-407.*
Wim Sweldens, "The Lifting Scheme: A Custom-Design Construction of Biorthogonal Wavelets", Applied and Computational Harmonic Analysis 3, Article No. 0015, 1996, pp. 186-200.
Christos Chrysafis, et al., "Line-Based, Reduced Memory, Wavelet Image Compression", IEEE Transactions on Image Processing vol. 9, No. 3, Mar. 2000, pp. 378-389.

* cited by examiner

*Primary Examiner* — Bernard Krasnic
(74) *Attorney, Agent, or Firm* — Oblon, Spivak, McClelland, Maier & Neustadt, L.L.P.

(57) ABSTRACT

An image processing apparatus includes a horizontal analysis filtering unit that receives image data in units of lines and generates a low-frequency component and a high-frequency component by performing horizontal low-pass analysis filtering and horizontal high-pass analysis filtering every time the number of samples in a horizontal direction reaches a predetermined value; and a vertical analysis filtering unit that generates coefficient data of a plurality of subbands by performing vertical low-pass analysis filtering and vertical high-pass analysis filtering every time the number of lines in a vertical direction of low-frequency and high-frequency components generated by the horizontal analysis filtering unit reaches a predetermined value.

19 Claims, 15 Drawing Sheets

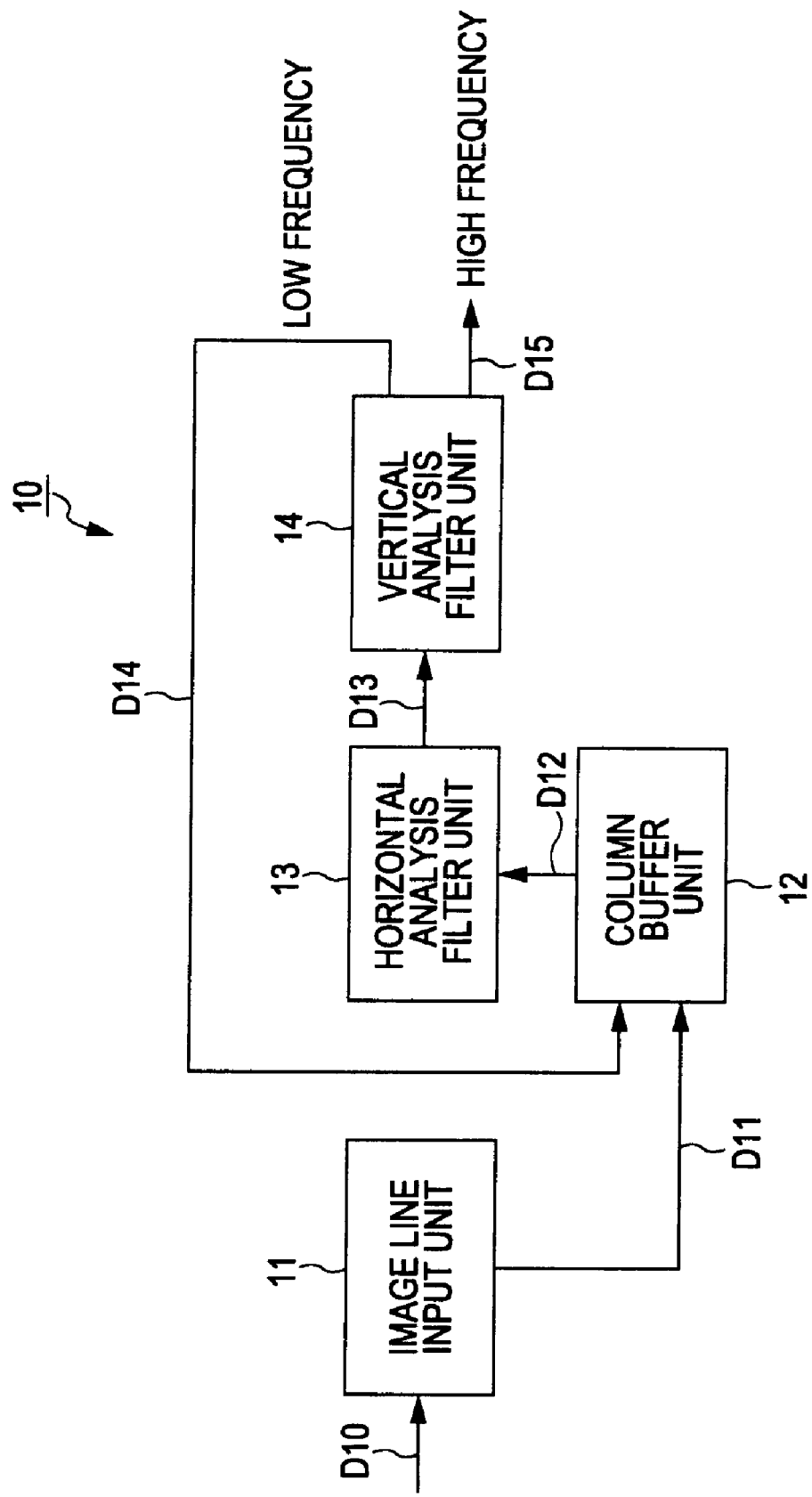

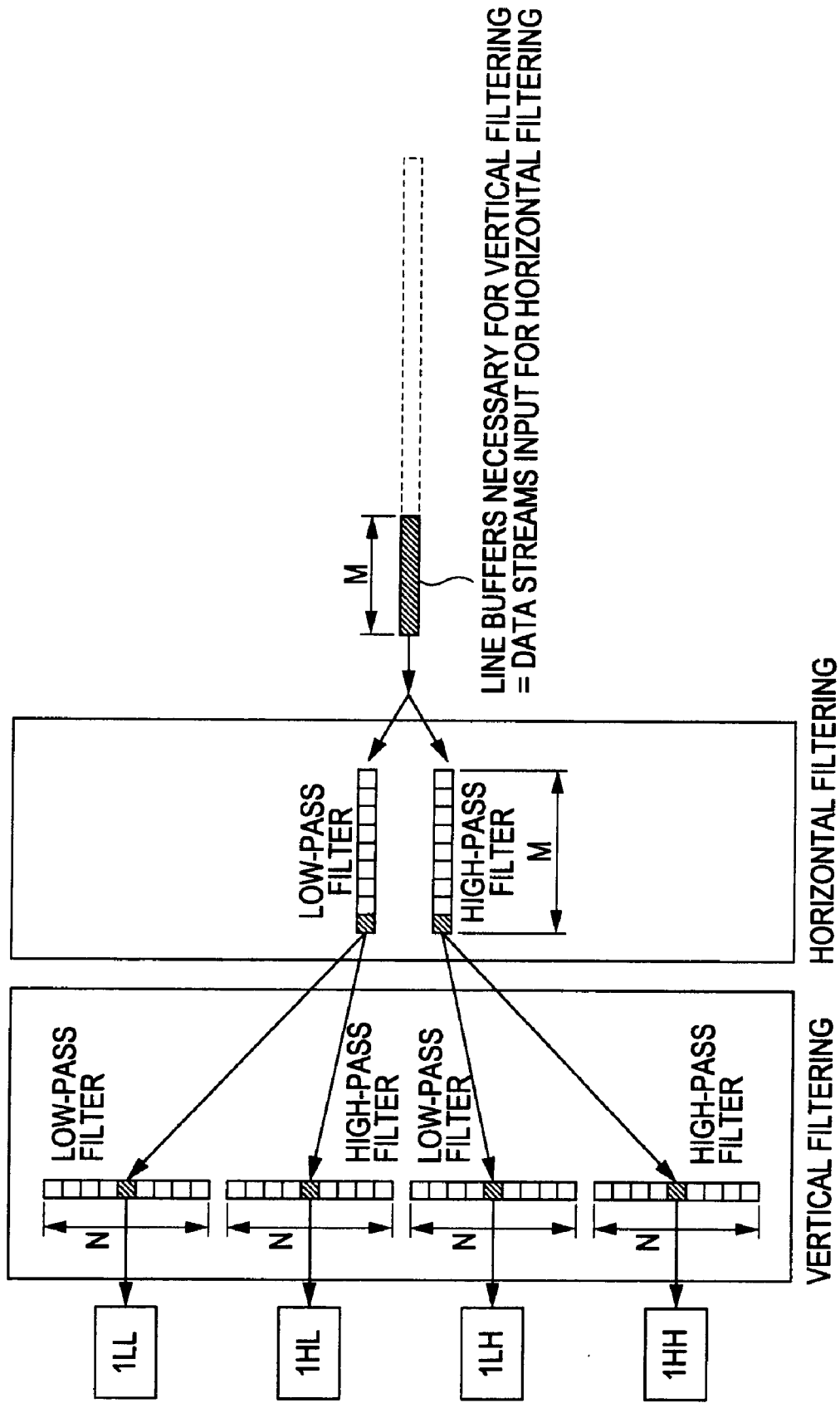

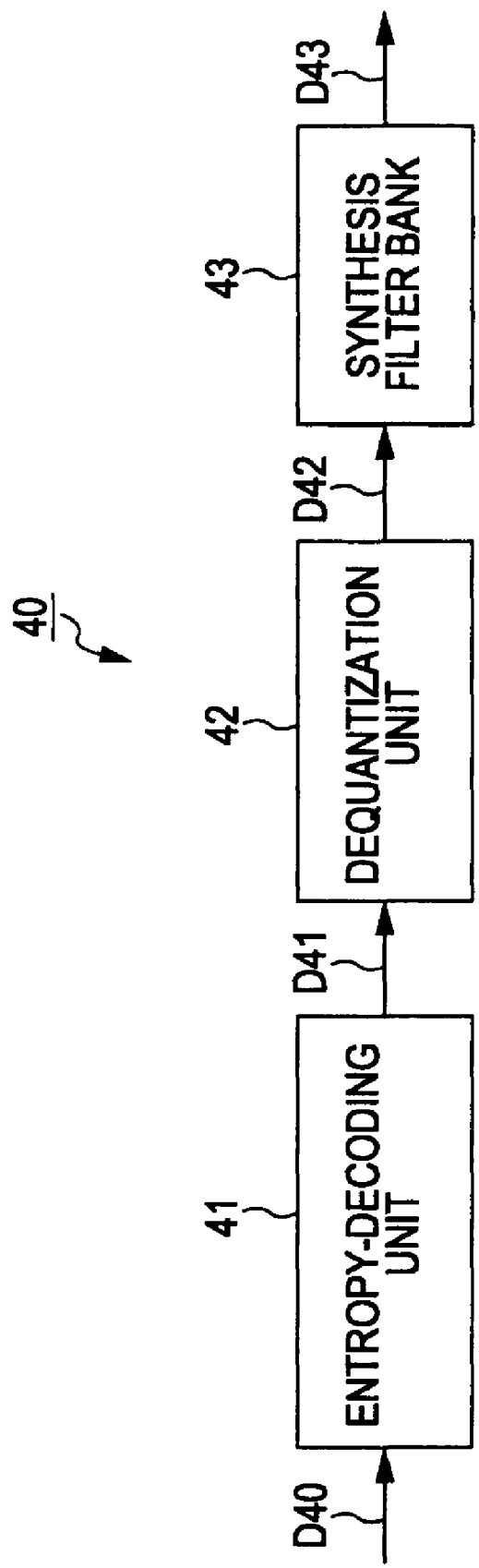

IMAGE PROCESSING APPARATUS AND IMAGE PROCESSING METHOD

CROSS REFERENCES TO RELATED APPLICATIONS

The present invention contains subject matter related to Japanese Patent Application JP 2006-136875 filed in the Japanese Patent Office on May 16, 2006, the entire contents of which are incorporated herein by reference.

BACKGROUND OF THE INVENTION

1. Field of the Invention

The present invention relates to a band analysis apparatus and method for performing, using a filter bank, band analysis of an input image and dividing the image into a plurality of subbands, to a band synthesis apparatus and method for performing, using a filter bank, band synthesis of an image divided into a plurality of subbands, to an image encoding apparatus and method for performing, using a filter bank, band analysis of an input image and encoding the image that has been subjected to band analysis to generate an encoded code-stream, to an image decoding apparatus and method for decoding an encoded code-stream and performing, using a filter bank, band synthesis of the decoded code-stream, to a program, and to a recording medium.

2. Description of the Related Art

As a typical method for compressing images, a Joint Photographic Experts Group (JPEG) method, which is standardized by the International Organization for Standardization (ISO), is available. The JPEG method uses discrete cosine transform (DCT) and provides excellent encoded images and decoded images at a relatively high bit rate. However, when the encoding bit rate is reduced to a predetermined value or less, block noise, which is specific to DCT transform, is significantly increased. Thus, deterioration becomes conspicuous from a subjective point of view.

In recent years, research and development of methods for dividing an image into a plurality of subbands using a filter bank, which is a combination of a low-pass filter and a high-pass filter, and performing encoding of each of the plurality of subbands has been actively conducted. In such circumstances, wavelet-transform encoding has been regarded as a new promising technique that will take the place of DCT transform since wavelet-transform encoding does not have a disadvantage that block noise becomes conspicuous at high compression, unlike DCT transform.

The JPEG 2000, for which international standardization was completed in January 2001, adopts a method in which the above-mentioned wavelet transform and high-efficiency entropy coding (bit modeling and arithmetic coding for each bit-plane) are combined together. The JPEG 2000 achieves a significant improvement in encoding efficiency, compared with any other JPEG method.

For example, a technique described in C. Chrysafis and A. Ortega, "Line Based, Reduced Memory, Wavelet Image Compression", IEEE Trans. Image Processing, Vol. 9, pp. 378-389, March 2000 is available.

SUMMARY OF THE INVENTION

In wavelet transform, basically, analysis filtering is performed for the entity of an image. Thus, it is necessary to store and hold a number of wavelet transform coefficients whose number corresponds to the number of pixels of the entire image. Thus, a higher-capacity memory is necessary for an image having a higher resolution, resulting in severe constraints in hardware development and the like.

In order to solve this problem, some wavelet transform methods with reduced memory requirement have been suggested. Line-based wavelet transform is one of the most important methods from among such wavelet transform methods with reduced memory requirement (see, for example, C. Chrysafis and A. Ortega, "Line Based, Reduced Memory, Wavelet Image Compression", IEEE Trans. Image Processing, Vol. 9, pp. 378-389, March 2000). In the technique described in C. Chrysafis and A. Ortega, "Line Based, Reduced Memory, Wavelet Image Compression", IEEE Trans. Image Processing, Vol. 9, pp. 378-389, March 2000, wavelet transform is performed immediately after the number of input lines of an image reaches a predetermined value. Thus, a necessary memory capacity can be significantly reduced while wavelet transform coefficients that are the same as wavelet transform coefficients obtained when wavelet transform is performed for the entire image are obtained. In addition, a delay time necessary for starting wavelet transform can be reduced.

However, for example, in order to realize an apparatus that encodes and transmits an image in real time and that receives and decodes the image, it is necessary to further reduce a delay time for processing from encoding of the image to decoding of an encoded code-stream to reconstruct the image. In addition, in the field of hardware development, further reduced memory requirement has been desired.

Accordingly, it is desirable to provide a band analysis apparatus and method for performing band analysis of an image with a reduced memory requirement and with low delay, a band synthesis apparatus and method for performing band synthesis of an image with a reduced memory requirement and with low delay, an image encoding apparatus and method for encoding an image while performing such band analysis, an image decoding apparatus and method for decoding an image while performing such band synthesis, a program, and a recording medium.

An image processing apparatus according to an embodiment of the present invention includes horizontal analysis filtering means for receiving image data in units of lines and for generating a low-frequency component and a high-frequency component by performing horizontal low-pass analysis filtering and horizontal high-pass analysis filtering every time the number of samples in a horizontal direction reaches a predetermined value; and vertical analysis filtering means for generating coefficient data of a plurality of subbands by performing vertical low-pass analysis filtering and vertical high-pass analysis filtering every time the number of lines in a vertical direction of low-frequency and high-frequency components generated by the horizontal analysis filtering means reaches a predetermined value.

An image processing apparatus according to another embodiment of the present invention includes input means for inputting coefficient data of a plurality of subbands generated by performing horizontal low-pass and high-pass analysis filtering and vertical low-pass and high-pass analysis filtering of image data; vertical synthesis filtering means for generating a low-frequency component and a high-frequency component by performing, every time the number of lines in a vertical direction reaches a predetermined value, vertical low-pass synthesis filtering and vertical high-pass synthesis filtering of the coefficient data of the plurality of subbands input by the input means; and horizontal synthesis filtering means for synthesizing a predetermined number of subbands by performing horizontal low-pass synthesis filtering and horizontal high-pass synthesis filtering every time the number of samples in a horizontal direction of low-frequency and high-frequency components generated by the vertical synthesis filtering means reaches a predetermined value.

Accordingly, band analysis and band synthesis of image data with reduced memory requirement and low delay can be achieved. In addition, image data can be encoded and decoded while such band analysis and band synthesis is performed.

BRIEF DESCRIPTION OF THE DRAWINGS

FIG. 1 schematically shows a configuration of a band analysis apparatus according to a first embodiment;

FIG. 3 shows a case where the band analysis apparatus performs vertical filtering after performing horizontal filtering;

FIG. 17 schematically shows a configuration of an image decoding apparatus according to a fourth embodiment.

DESCRIPTION OF THE PREFERRED EMBODIMENTS

Figure 2A:
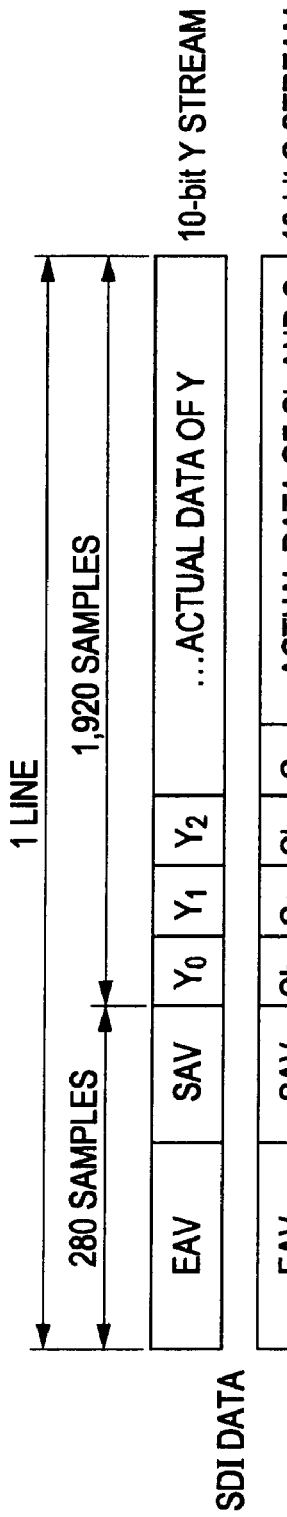
FIGS. 2A and 2B schematically show elements of data of an HDTV video signal.

Embodiments of the present invention will be described with reference to the drawings.
First Embodiment A band analysis apparatus according to a first embodiment that performs, using an analysis filter bank, band analysis of an input video signal to divide the video signal into a plurality of subbands will be described.

FIG. 1 schematically shows a configuration of a band analysis apparatus according to the first embodiment. Referring to FIG. 1, the band analysis apparatus 10 includes an image line input unit 11, a column buffer unit 12, a horizontal analysis filter unit 13, and a vertical analysis filter unit 14.

The image line input unit 11 receives a video signal D10 for each line, and supplies a data stream D11 for the image line to the column buffer unit 12.

Video signals are normally defined by a standard. For example, currently, television broadcasting is performed in accordance with a National Television Standards Committee (NTSC) system. In addition, a high definition television (HDTV) system is standardized as a standard number "SMPTE 274M" by the Society of Motion Picture and Television Engineers (SMPTE), which is a standard-setting organization in the United States. In the description below, the HDTV system (a resolution of 1920×1080) will be described as an example.

FIG. 2A shows a configuration of elements of data of an HDTV video signal. A luminance signal Y has actual 1920 samples per line. Sample data of an end of active video (EAV) signal and sample data of a start of active video (SAV) signal, which are 280 samples in total, are placed before the actual sample data of the luminance signal Y. Color-difference signals Cb and Cr have a similar configuration. However, the color-difference signals Cb and Cr have a 4:2:2 format, and the number of actual samples of each of the color-difference signals Cb and Cr is half the number of actual samples of the luminance signal Y. Thus, the total number of actual samples of the color-difference signals Cb and Cr is equal to the number of actual samples of the luminance signal Y. By multiplexing the luminance signal Y and the color-difference signals Cb and Cr, data including 560 samples of the EAV and SAV signals and 3840 samples of the luminance signal Y and the color-difference signals Cb and Cr is generated, as shown in FIG. 2B.

Figure 2B:
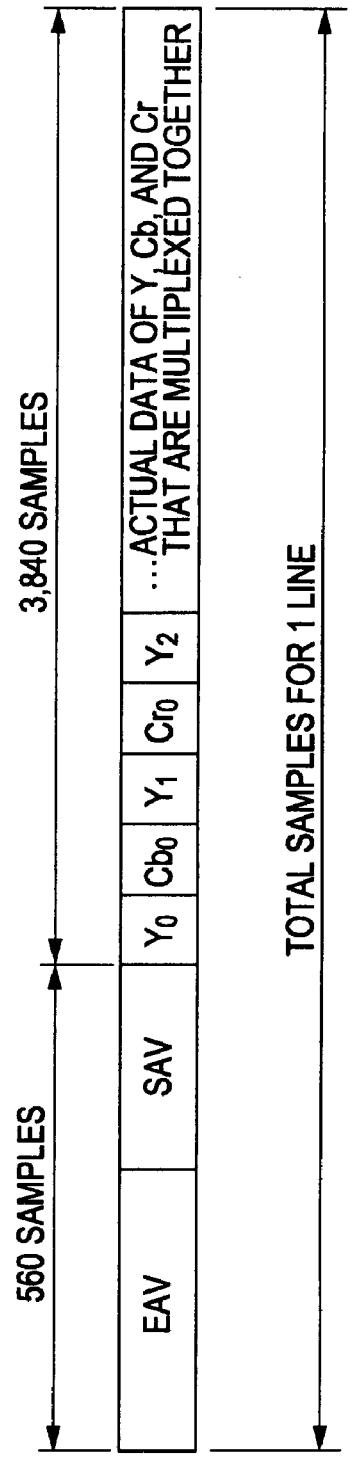

Thus, when a signal based on the SMPTE 274M standard of the HDTV system, which is commonly called as the "HD-SDI" standard, is input as the video signal D10, the data stream D11 for the image line is obtained as multiplexed sample data, as shown in FIG. 2B. The description will be given below on the assumption mentioned above.

Figure 4:
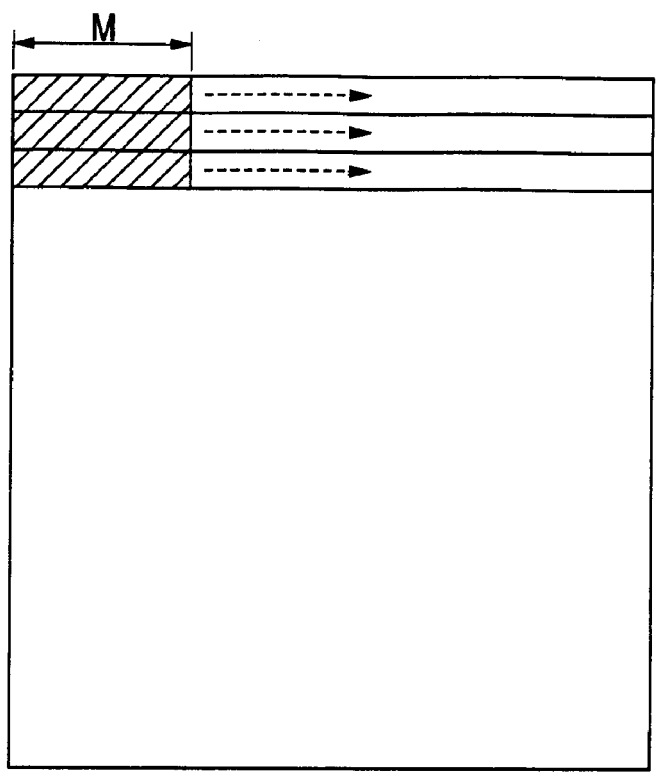
FIG. 4 illustrates buffering performed for each M columns.

The column buffer unit 12 stores and holds data streams D11 for individual columns, and continues to store and hold data streams D11 until data streams D11 for M columns are stored, as shown in FIGS. 3 and 4. The value M corresponds to the number of taps of horizontal filtering. The value M increases as the number of taps increases.

The horizontal analysis filter unit 13 sequentially reads column data D12 for M columns, and performs horizontal low-pass analysis filtering and horizontal high-pass analysis filtering. Due to the horizontal filtering, a low-frequency component (L) and a high-frequency component (H) D13, which are obtained by of horizontal division, are generated, as shown in FIG. 5.

Figure 5:
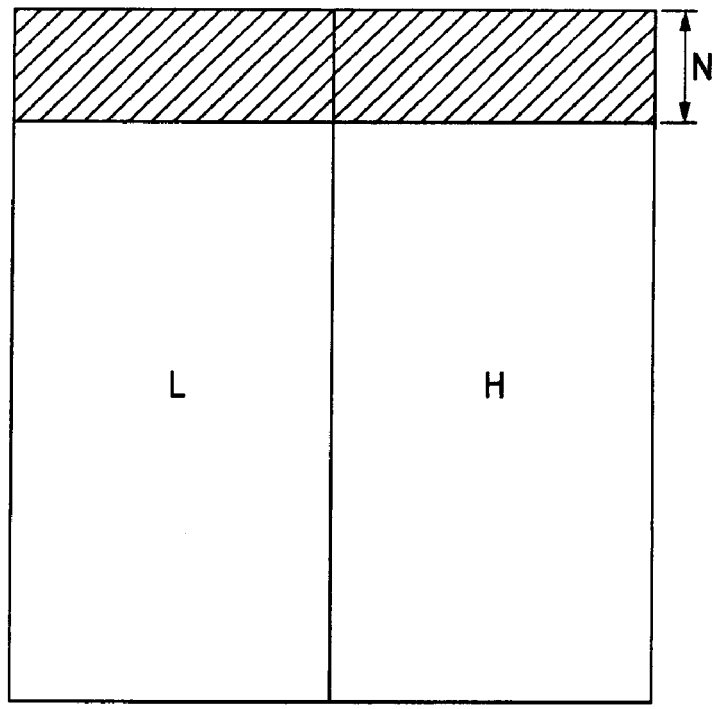
FIG. 5 illustrates horizontal filtering in analysis filtering at division level 1.
Figure 6:
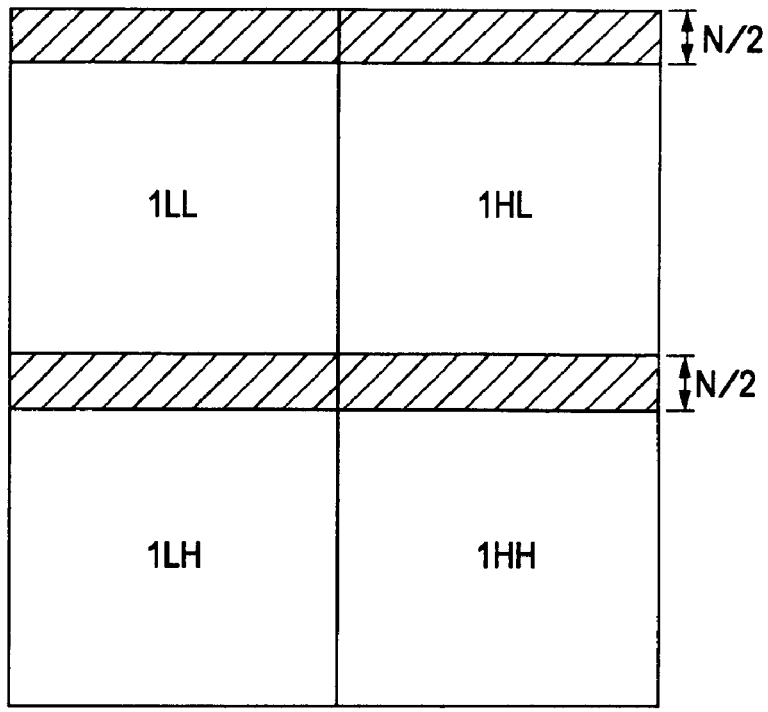
FIG. 6 illustrates vertical filtering in analysis filtering at division level 1.

Immediately after the number of lines of low-frequency and high-frequency components D13 reaches N, the vertical analysis filter unit 14 performs vertical low-pass analysis filtering and vertical high-pass analysis filtering, as shown in FIGS. 3 and 5. The value N corresponds to the number of taps of vertical filtering. The value N increases as the number of taps increases. Due to the vertical filtering, a low-frequency component (1LL) D14 and high-frequency components (1HL, 1LH, and 1HH) D15, which are obtained by vertical division, are generated, as shown in FIGS. 3 and 6. Concerning the order of letters "L" and "H" in FIGS. 3 and 6, the first letter indicates a band obtained after horizontal filtering is performed, and the last letter indicates a band obtained after vertical filtering is performed. In addition, the number disposed before the letter "L" or "H" indicates division level.

As a result of analysis filtering at division level 1, the vertical analysis filter unit 14 generates the low-frequency component (1LL) D14 and the high-frequency components (1HL, 1LH, and 1HH) D15, as described above.

In wavelet transform, normally, a high-frequency component generated in the course of analysis filtering is not further analyzed. Thus, in the first embodiment, the high-frequency components (1HL, 1LH, and 1HH) D15 are output without being further analyzed. In contrast, the low-frequency component (1LL) D14 is supplied to the column buffer unit 12 so as to be further analyzed by an analysis filter bank. Immediately after the number of columns necessary for horizontal analysis filtering is buffered in the column buffer unit 12, analysis filtering at division level 2 is performed. A low-frequency component is repeatedly divided as described above, since most of the energy of an image signal is concentrated in the low-frequency component.

Figure 7:
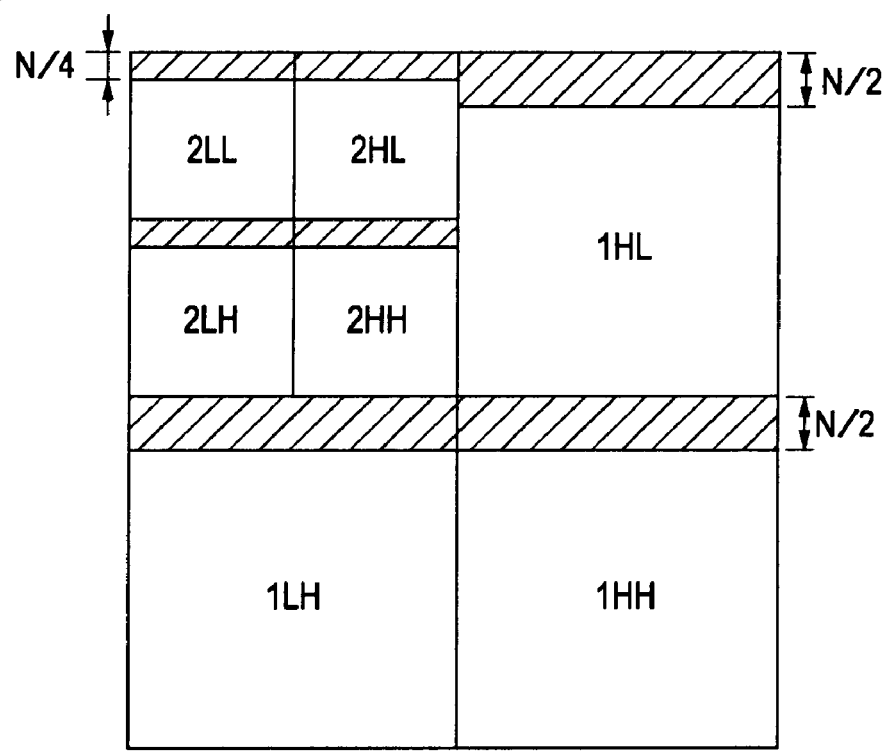
FIG. 7 shows a result obtained by performing analysis filtering until division level 2.

In the analysis filtering at division level 2, the horizontal analysis filter unit 13 sequentially reads column data D12 for M columns, and performs horizontal low-pass analysis filtering and horizontal high-pass analysis filtering. Then, immediately after the number of lines of low-frequency and high-frequency components D13 reaches N/2, the vertical analysis filter unit 14 performs vertical low-pass analysis filtering and high-pass analysis filtering, as shown in FIG. 6. Due to the vertical filtering, a low-frequency component (2LL) and high-frequency components (2HL, 2LH, and 2HH) are generated, as shown in FIG. 7. Referring to FIG. 7, a subband 1LL at division level 1 is divided into four subbands, 2LL, 2HL, 2LH, and 2HH.

Figure 8:
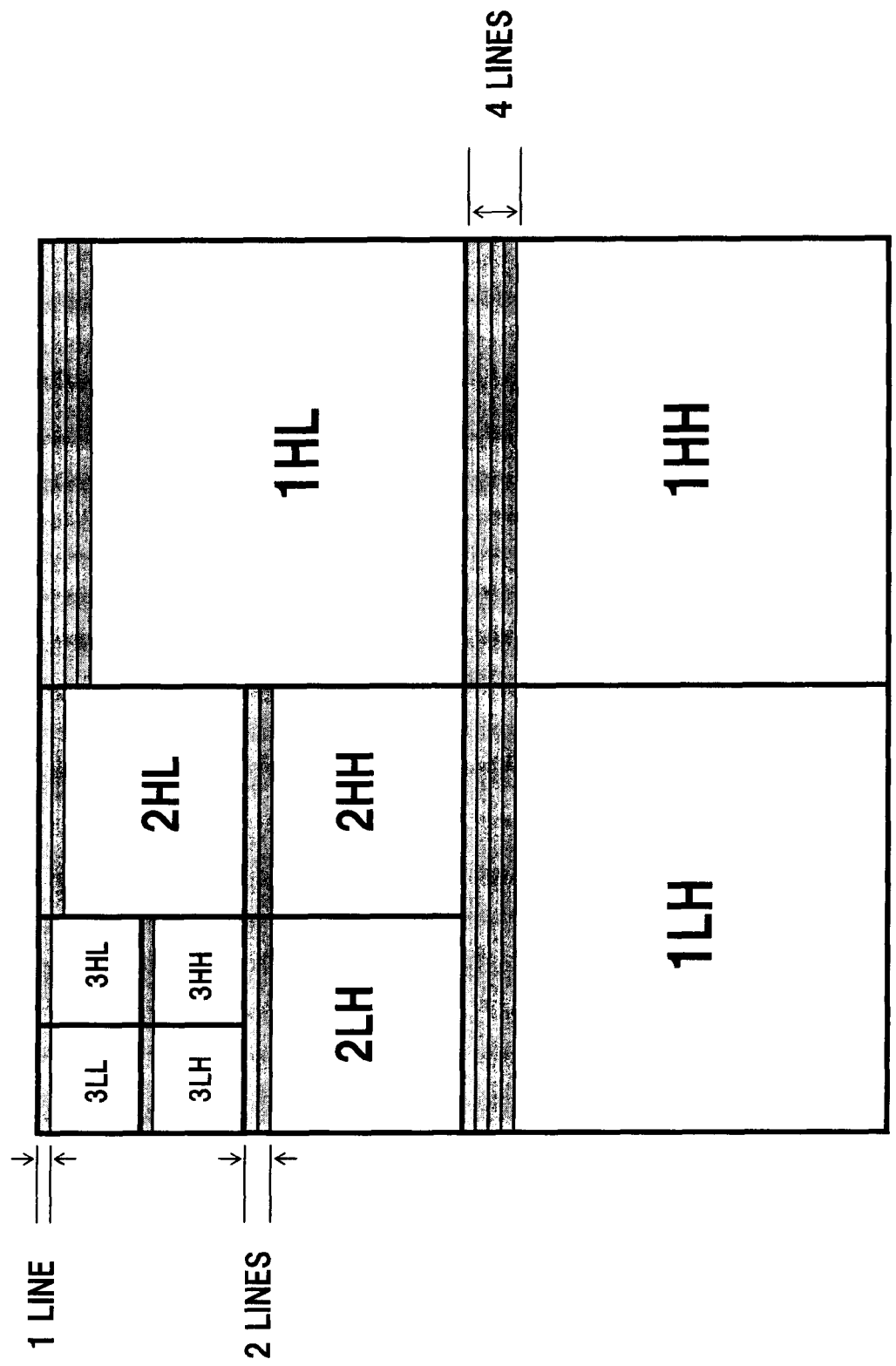
FIG. 8 shows a result obtained by performing analysis filtering for an actual image until division level 3.

In order to further increase the division level, analysis filtering can be repeatedly performed for a low-frequency component. FIG. 8 shows an example in which subband division by analysis filtering is performed for an actual image until division level 3.

As the most general arithmetic method of the above-mentioned analysis filtering, a method called convolutional operation is available. The convolutional operation is the most fundamental procedure for achieving a digital filter. As the convolutional operation, convolution multiplication of a filter tap coefficient by actual input data is performed. However, the convolutional operation generates a problem in which the calculation load increases as the tap length increases.

As a technique for solving the above-mentioned problem, a lifting technique for wavelet transform described in W. Sweldens, "The Lifting Scheme: A Custom-design Construction of Biorthogonal Wavelets", Appl. Comput. Harmon. Anal., vol. 3, n0.2, pp. 186-200, 1996 is known.

Figure 9:
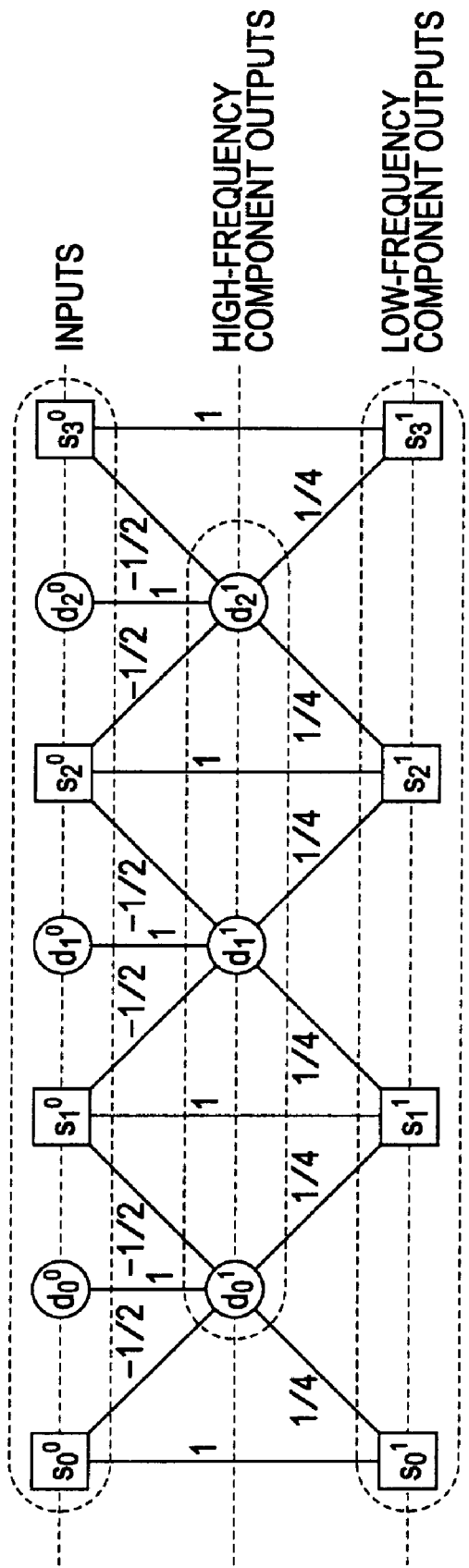
FIG. 9 shows a lifting structure of a 5×3-analysis filter.

FIG. 9 shows a lifting structure of a 5×3-analysis filter, which is adopted in the JPEG 2000 standard. Analysis filtering in which the lifting technique is applied to the 5×3-analysis filter will be schematically explained with reference to FIG. 9.

Referring to FIG. 9, pixels of an input image are shown in the uppermost row, high-frequency component outputs are shown in the intermediate row, and low-frequency component outputs are shown in the lowest row. Pixels of an input image are not necessarily shown in the uppermost row. Coefficients obtained by the above-mentioned analysis filtering may be shown in the uppermost row. In this embodiment, pixels of an input image are shown in the uppermost row. Even-numbered pixels or lines are represented as squares, and odd-numbered pixels or lines are represented as circles.

As the first step, a high-frequency component coefficient $d_i^1$ is generated from input pixels, using the following equation:

$$d_i^1 = d_i^0 - \tfrac{1}{2}(s_i^0 + s_{i+1}^0) \qquad (1).$$

Then, as the second step, a low-frequency component coefficient $s_i^1$ is generated in accordance with the generated high-frequency component coefficient and odd-numbered pixels from among the input pixels, using the following equation:

$$s_i^1 = s_i^0 + \tfrac{1}{4}(d_{i-1}^1 + d_i^1) \qquad (2).$$

As described above, in analysis filtering, after a high-frequency component is generated, a low-frequency component is generated. Two types of filter banks used for such analysis filtering have only two taps, which can be represented using Z transform representation as "$P(z)=(1+z^{-1})/2$" and "$U(z)=(1+z^{-1})/4$". That is, although five taps are originally necessary, only two taps are necessary in this embodiment. Thus, the amount of calculation can be significantly reduced. Therefore, it is desirable that such a lifting technique is used for horizontal filtering and vertical filtering in the band analysis apparatus 10.

Figure 10:
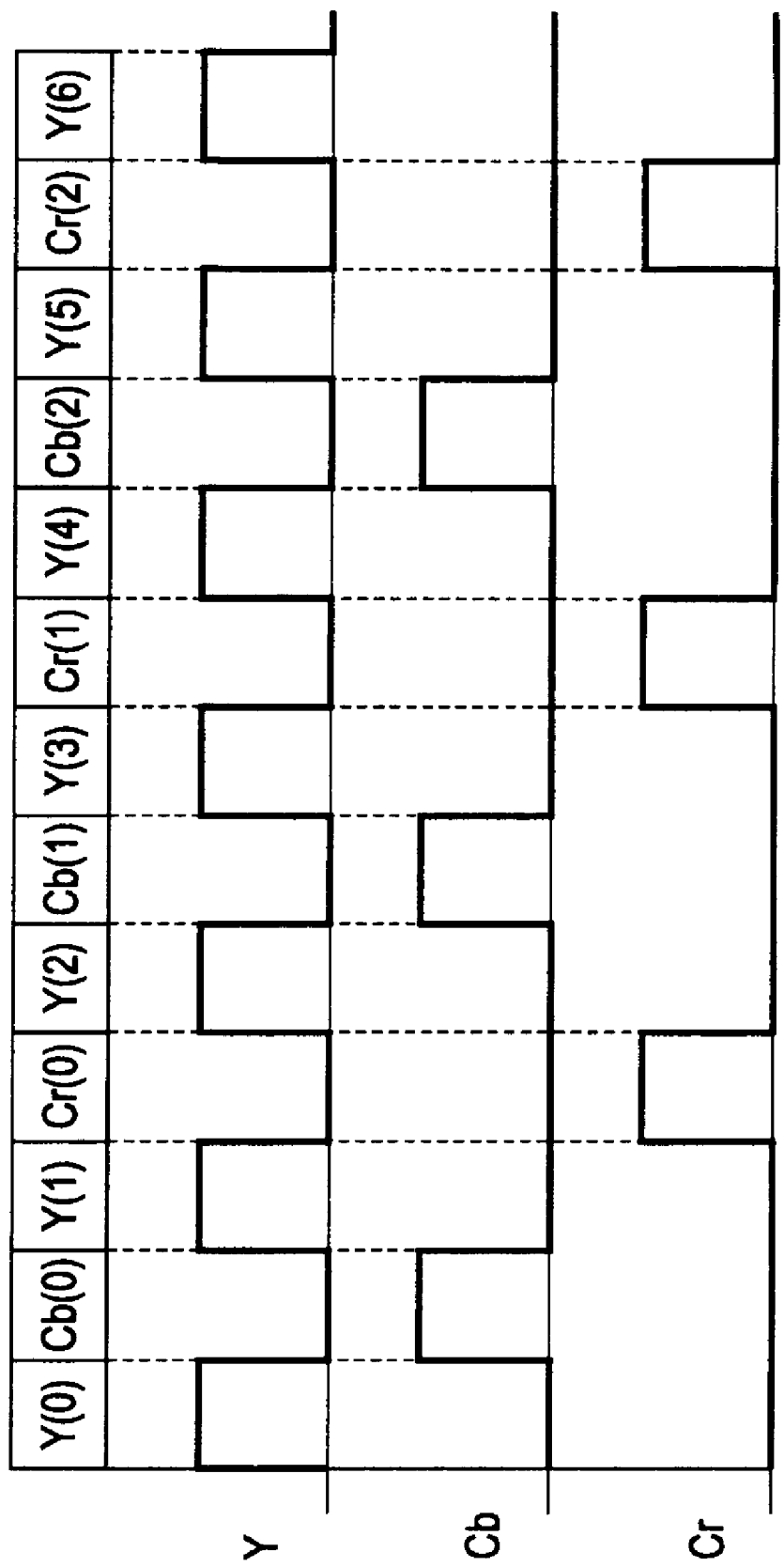
FIG. 10 is an illustration for explaining a data stream of Y, Cb, and Cr that are multiplexed together and timing of analysis filtering.

A data stream D11 for an image line includes a luminance signal Y and color-difference signals Cb and Cr that are multiplexed together, as described above. In this case, the use of the sampling rate of each component (Y,Cb, Cr) effectively achieves analysis filtering. That is, as shown in FIG. 10, Y data is input every two cycles, whereas each of Cb data and Cr data is input every four cycles. Thus, by sequentially performing analysis filtering utilizing a time difference between input Y data, Cb data, and Cr data, Y,Cr,Cb filtering can be performed using a single analysis filter bank without delay.

Since the above-mentioned analysis filtering is performed in units of pictures (fields/frames) forming a video signal, it is necessary to detect an end point of a picture and to stop and reset an operation of analysis filtering.

Figure 11:
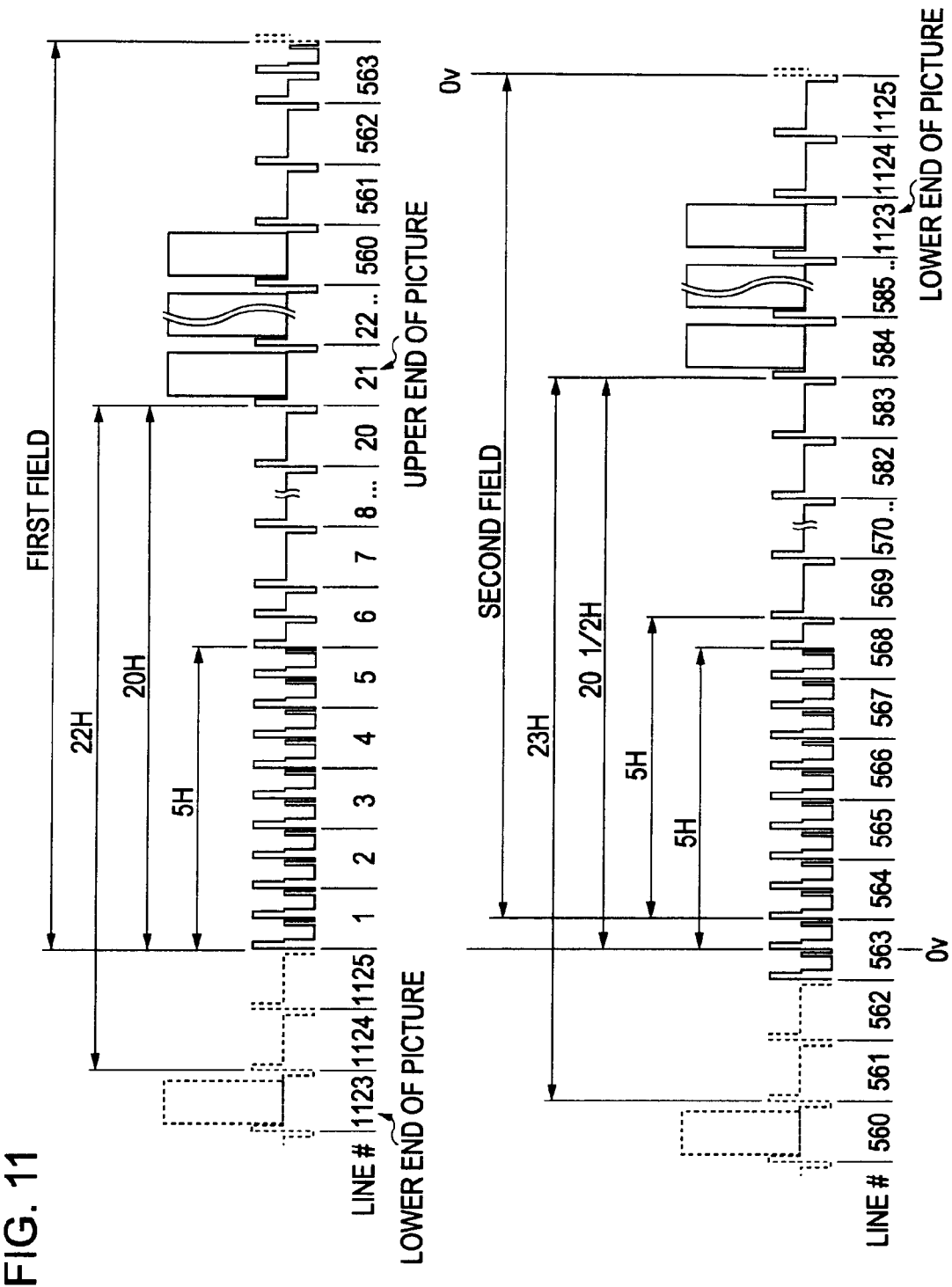
FIG. 11 includes signal distribution diagrams showing an interlace signal from among signals based on the SMPTE 274M standard and shows a position where a vertical synchronizing signal is inserted.

The image line input unit 11 may include a unit to detect a vertical synchronizing signal of a video signal, so that the end point of the picture can be detected. FIG. 11 includes signal distribution diagrams showing an interlace signal from among signals based on the SMPTE 274M standard. In FIG. 11, an upper diagram shows a first field and a lower diagram shows a second field. Referring to FIG. 11, a vertical synchronizing signal for 22 lines is disposed at the beginning of the first field, and a vertical synchronizing signal for 23 lines is disposed at the beginning of the second field. Thus, with such a vertical synchronizing signal, the end point of a picture can be easily detected. Then, immediately after detection is performed, an operation of analysis filtering can be stopped.

As described above, as wavelet transform of the related art, line-based wavelet transform described in C. Chrysafis and A. Ortega, "Line Based, Reduced Memory, Wavelet Image Compression", IEEE Trans. Image Processing, Vol. 9, pp. 378-389, March 2000 is known.

Figure 12:
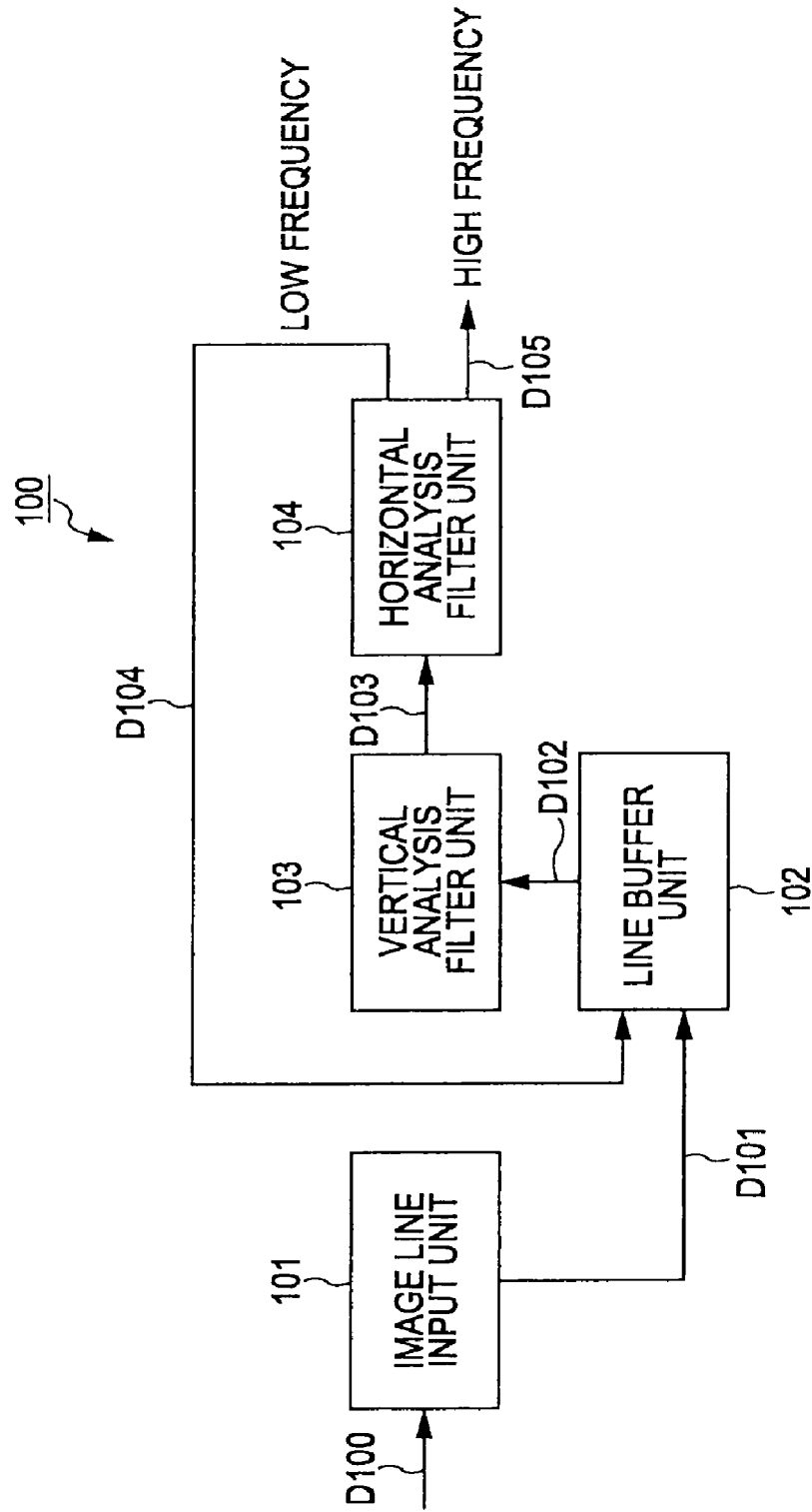
FIG. 12 schematically shows a configuration of a band analysis apparatus of the related art.

FIG. 12 schematically shows a configuration of a band analysis apparatus 100 that achieves such line-based wavelet transform. Referring to FIG. 12, the band analysis apparatus 100 includes an image line input unit 101, a line buffer unit 102, a vertical analysis filter unit 103, and a horizontal analysis filter unit 104.

The image line input unit 101 receives a video signal D100 for each line, and supplies a data stream D101 for the image line to the line buffer unit 102.

Figure 13:
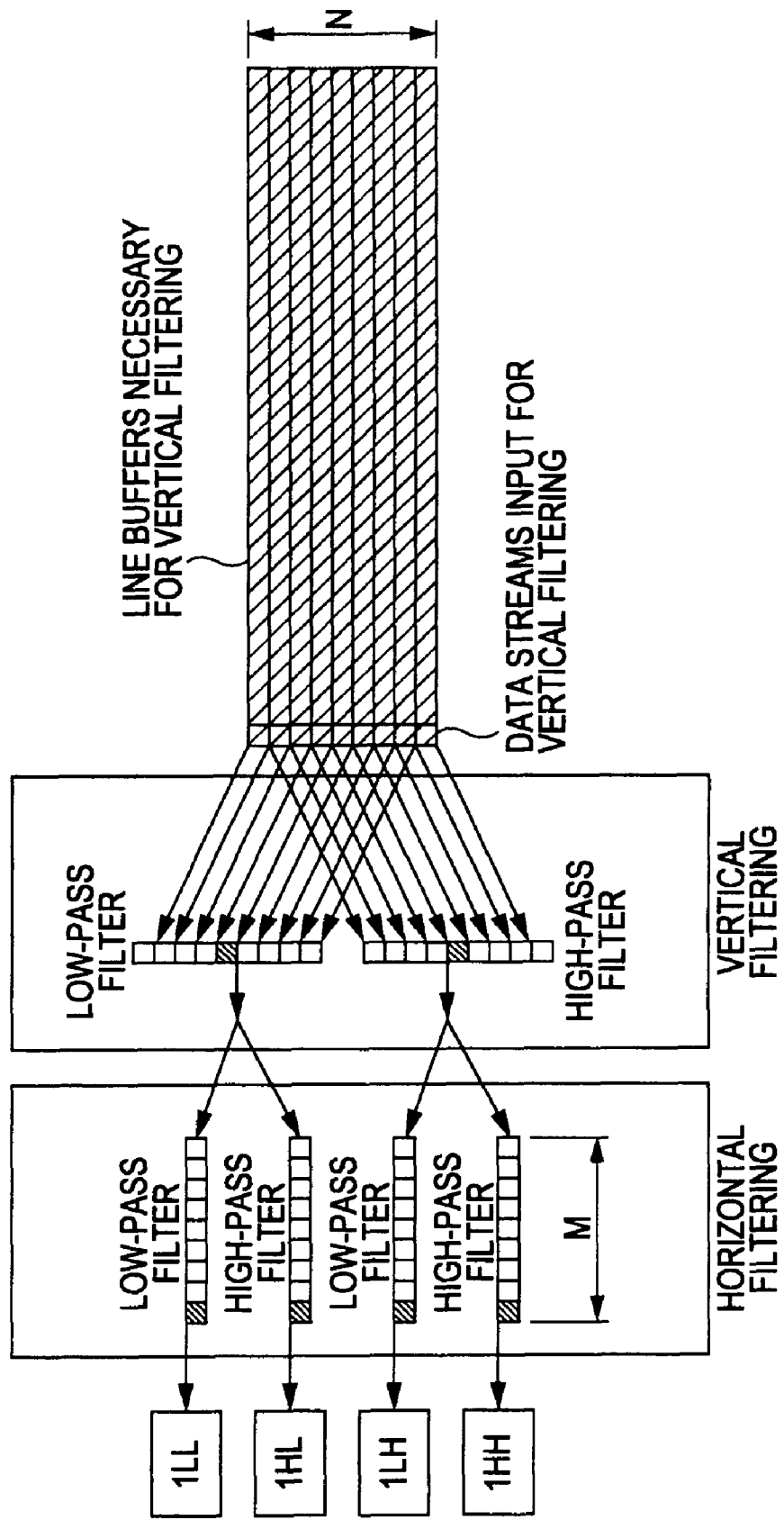
FIG. 13 shows a case where the band analysis apparatus of the related art performs horizontal filtering after performing vertical filtering.

The line buffer unit 102 stores and holds data streams D101 for individual lines, and continues to store and hold data streams D101 until data streams D101 for N lines are stored, as shown in FIG. 13.

The vertical analysis filter unit 103 sequentially reads line data D102 for N lines, and performs vertical low-pass analysis filtering and vertical high-pass analysis filtering, as shown in FIG. 13. Due to the vertical filtering, a low-frequency component (L) and a high-frequency component (H) D103, which are obtained by vertical division, are generated.

Immediately after the number of columns of low-frequency and high-frequency components D103 reaches M, the horizontal analysis filter unit 104 performs horizontal low-pass analysis filtering and horizontal high-pass analysis filtering, as shown in FIG. 13. Due to the horizontal filtering, a low-frequency component (1LL) D104 and high-frequency components (1HL, 1LH, and 1HH) D105, which are obtained by horizontal division, are generated.

As described above, a subband that is generated by line-based wavelet transform described in C. Chrysafis and A. Ortega, "Line Based, Reduced Memory, Wavelet Image Compression", IEEE Trans. Image Processing, Vol. 9, pp. 378-389, March 2000 is the same as a subband that is generated by wavelet transform performed by the band analysis apparatus 10.

However, for the line-based wavelet transform, buffering corresponding to the value obtained by multiplying the size of an image in the horizontal direction by N (lines) is necessary, as shown in FIG. 13. In addition, since vertical filtering is performed after such buffering is completed, a delay time, which is a time until vertical filtering is started, is generated.

In contrast, only 1 (line)×M (columns) column buffers are necessary for wavelet transform to be performed by the band analysis apparatus 10. Thus, the necessary memory capacity can be significantly reduced compared with a case where a line buffer is used. Moreover, since horizontal analysis filtering can be started immediately after data for the number of column buffers is input, a delay time until wavelet transform is started can be significantly reduced compared with line-based wavelet transform.

Second Embodiment

The band analysis apparatus 10 that divides a video signal into a plurality of subbands by performing wavelet transform has been described in the first embodiment. Normally, wavelet transform is often used as preprocessing of image compression. An image encoding apparatus according to a second embodiment that compresses and encodes coefficient data generated by wavelet transform will be described.

Figure 14:
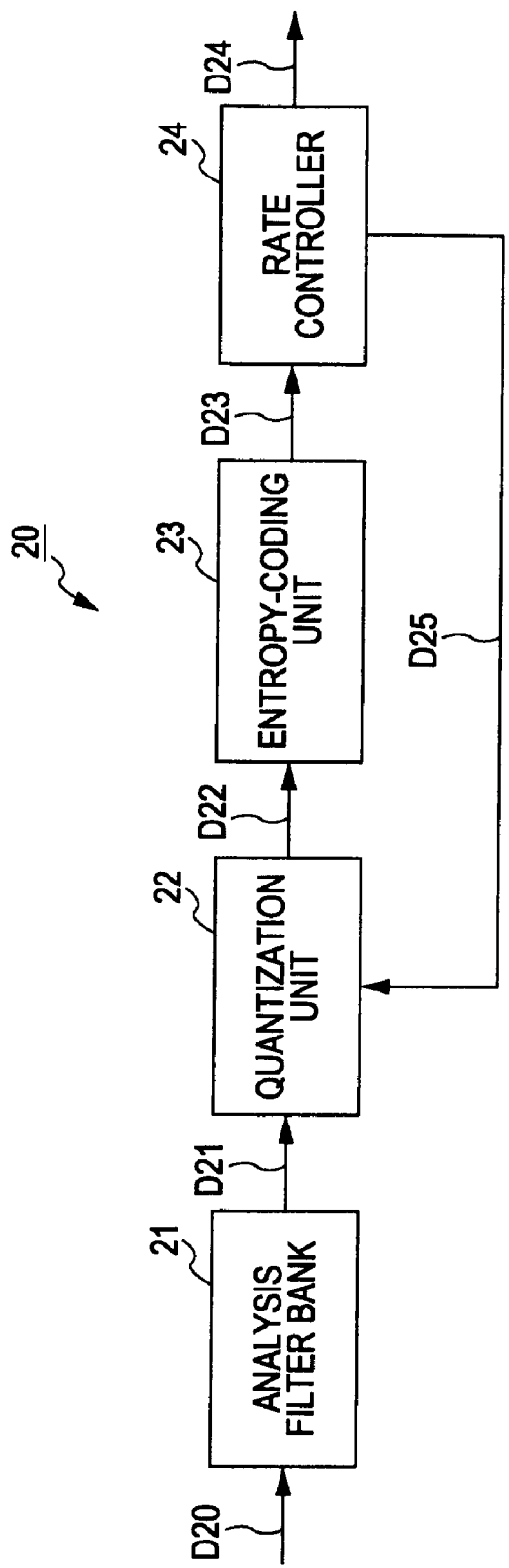
FIG. 14 schematically shows an image encoding apparatus according to a second embodiment.

FIG. 14 schematically shows a configuration of an image encoding apparatus 20 according to the second embodiment. The image encoding apparatus 20 includes an analysis filter bank 21, a quantization unit 22, an entropy-coding unit 23, and a rate controller 24.

The analysis filter bank 21 has a configuration similar to the band analysis apparatus 10 shown in FIG. 1. That is, the analysis filter bank 21 performs analysis filtering of an input video signal D20, and supplies coefficient data D21 obtained by analysis to the quantization unit 22. For example, in analysis filtering at division level 2, by performing wavelet transform of four lines of a subband 1LL generated by analysis filtering at division level 1, two lines of subbands 2LL, 2HL, 2LH, and 2HH are obtained. In analysis filtering at division level 3, by performing wavelet transform of two lines of a subband 2LL, a line of subbands 3LL, 3HL, 3LH, and 3HH is obtained. When analysis filtering at division level 3 is the final analysis filtering, the subband 3LL is a lowest-frequency subband.

The quantization unit 22 performs quantization by dividing the coefficient data D21 generated by the analysis filter bank 21 by, for example, a quantization step size, and generates quantized coefficient data D22.

The quantization unit 22 may form line blocks each including a line of a generated lowest-frequency subband (3LL, in the above-mentioned case) and a plurality of lines of other subbands necessary for generating the line of the lowest-frequency subband, and may set a quantization step size for each line block. Since a line block includes coefficients of all the subbands of an image area (ten subbands from 3LL to 1HH in the example shown in FIG. 8), if quantization is performed for each line block, an advantage of multiple resolution analysis, which is a feature of wavelet transform, can be exploited. In addition, since only the number of line blocks of the entire screen is determined, the load imposed on the image encoding apparatus 20 can be reduced.

In addition, since the energy of an image signal is generally concentrated in a low-frequency component and deterioration in the low-frequency component is conspicuous due to human visual characteristics, it is effective to perform weighting in quantization such that the quantization step size of the low-frequency component is smaller. Due to such weighting, a relatively larger amount of information can be allocated to the low-frequency component, thus improving the subjective quality of the entire image.

The entropy-coding unit 23 performs source encoding of the quantized coefficient data D22 generated by the quantization unit 22, and generates a compressed encoded code-stream D23. As source encoding, for example, Huffman coding adopted in the JPEG and the Moving Picture Experts Group (MPEG) or high-precision arithmetic coding adopted in the JPEG 2000 can be used.

Determination of a range of coefficients to be subjected to entropy coding is a very important factor that directly relates to compression efficiency. For example, in the JPEG and the MPEG, information is compressed by performing DCT transform for an 8×8 block and then performing Huffman coding for generated 64 DCT transform coefficients. That is, the 64 DCT transform coefficients form the range of entropy coding.

The analysis filter bank 21 performs wavelet transform in units of lines, unlike DCT transform performed for an 8×8 block. Thus, the entropy-coding unit 23 performs source coding for individual subbands and for each P lines of a subband.

The value P is at least 1. The amount of necessary reference information decreases as the number of lines decreases. Thus, the necessary memory capacity can be reduced. In contrast, the amount of necessary information increases as the number of lines increases. Thus, encoding efficiency can be increased. However, if the value P exceeds the number of lines forming a line block for a subband, a line forming the next line block is also necessary. Thus, a delay time until quantized coefficient data of the next line block is generated by wavelet transform and quantization is generated. Thus, in order to achieve low delay, it is necessary to have a value P that is equal to or smaller than the number of lines forming a line block. For example, in the example shown in FIG. 8, since the number of lines forming a line block for the subbands 3LL, 3HL, 3LH, and 3HH is 1, the value P is set to 1. In addition, since the number of lines forming a line block for the subbands 2HL, 2LH, and 2HH is 2, the value P is set to 1 or 2.

The rate controller 24 performs control so as to achieve a desired bit rate or compression rate. After performing rate control, the rate controller 24 outputs an encoded code-stream D24 whose rate has been controlled. For example, in order to achieve a higher bit rate, the rate controller 24 transmits to the quantization unit 22 a control signal D25 for decreasing the quantization step size. In contrast, in order to achieve a lower bit rate, the rate controller 24 transmits to the quantization unit 22 a control signal D25 for increasing the quantization step size.

Third Embodiment

A band synthesis apparatus according to a third embodiment that corresponds to the band analysis apparatus 10 according to the first embodiment will be described. In the third embodiment, synthesis filtering of an image that has been subjected to subband division until division level 3, as shown in FIG. 8, is performed.

Figure 15:
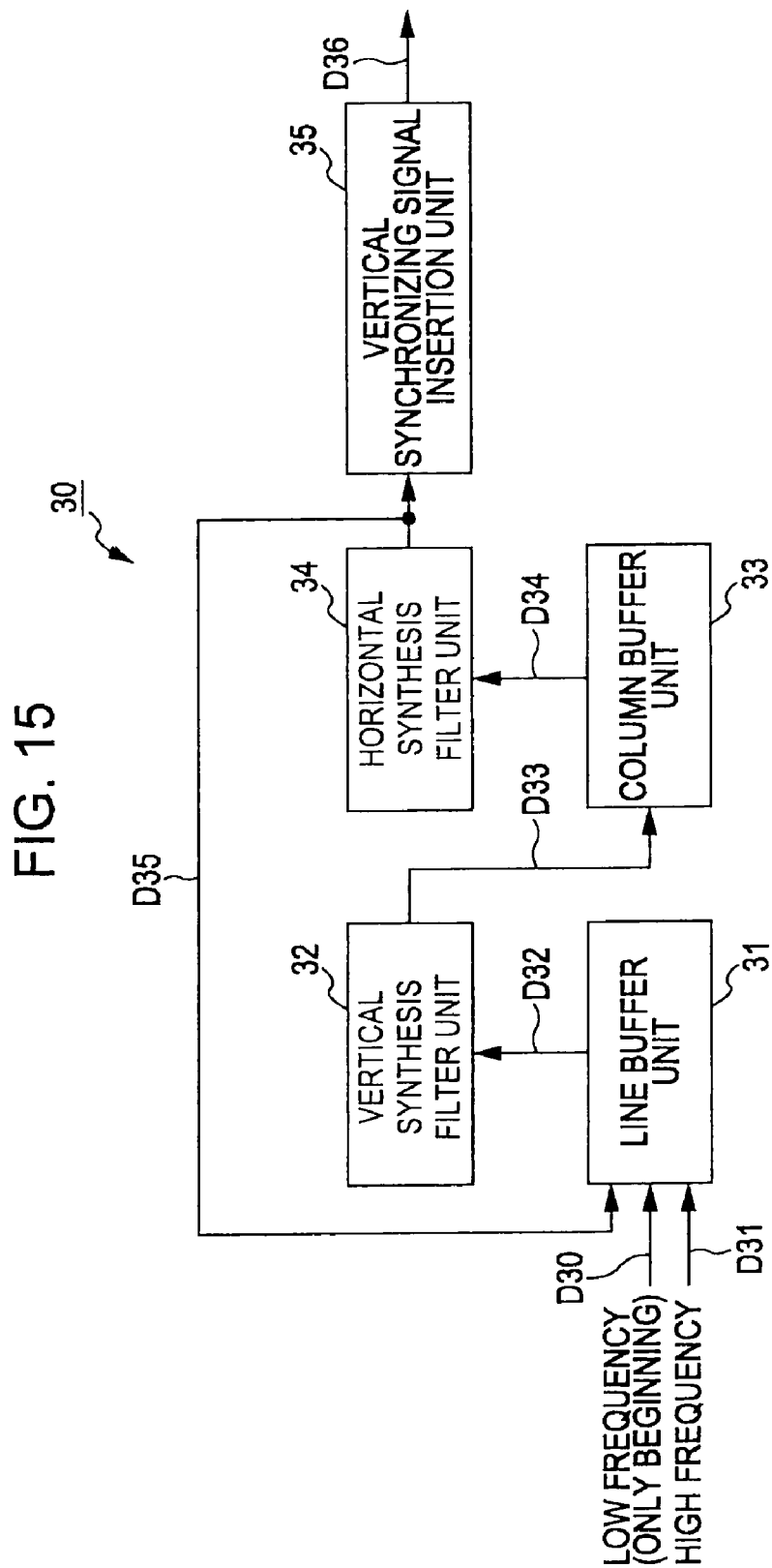
FIG. 15 schematically shows a band synthesis apparatus according to a third embodiment.

FIG. 15 schematically shows a configuration of a band synthesis apparatus 30 according to the third embodiment. Referring to FIG. 15, the band synthesis apparatus 30 includes a line buffer unit 31, a vertical synthesis filter unit 32, a column buffer unit 33, a horizontal synthesis filter unit 34, and a vertical synchronizing signal insertion unit 35.

The line buffer unit 31 stores and holds a low-frequency component (3LL) D30 and high-frequency components (3HL, 3LH, and 3HH) D31 for each line. The line buffer unit 31 continues to store and hold low-frequency components D30 and high-frequency components D31 until low-frequency components D30 and high-frequency components D31 for N lines are stored. A low-frequency component D30 only for a lowest-frequency subband 3LL is input to the line buffer unit 31. Then, low-frequency components D35 generated by synthesis filtering are supplied from the horizontal synthesis filter unit 34.

The vertical synthesis filter unit 32 sequentially reads line data D32 for N lines, and performs vertical low-pass synthesis filtering and vertical high-pass synthesis filtering. Due to the vertical filtering, low-frequency and high-frequency components D33, which are obtained by vertical synthesis, are generated.

The column buffer unit 33 stores and holds low-frequency and high-frequency components D33, which are obtained by vertical synthesis, for individual columns, and continues to store and hold low-frequency and high-frequency components D33 until low-frequency and high-frequency components D33 for M columns are stored.

The horizontal synthesis filter unit 34 sequentially reads column data D34 for M columns, and performs horizontal low-pass synthesis filtering and horizontal high-pass synthesis filtering. Due to the horizontal filtering, a low-frequency component (2LL) D35, which is obtained by horizontal synthesis, is generated.

As a result of synthesis filtering at division level 3, the horizontal synthesis filter unit 34 generates the low-frequency component (2LL).

Similarly, in synthesis filtering at division level 2, a low-frequency component (1LL) D35 is generated from the low-frequency component (2LL) D35 and the high-frequency components (2HL, 2LH, and 2HH) D31. In addition, in synthesis filtering at division level 1, an image data stream is generated from the low-frequency component (1LL) D35 and the high-frequency components (1HL, 1LH, and 1HH). The generated image data stream is supplied to the vertical synchronizing signal insertion unit 35.

The vertical synchronizing signal insertion unit 35 inserts a vertical synchronizing signal into the image data stream at a predetermined timing, as shown in FIG. 11, and outputs a generated video signal D36.

A lifting technique can also be applied to the above-mentioned synthesis filtering.

Figure 16:
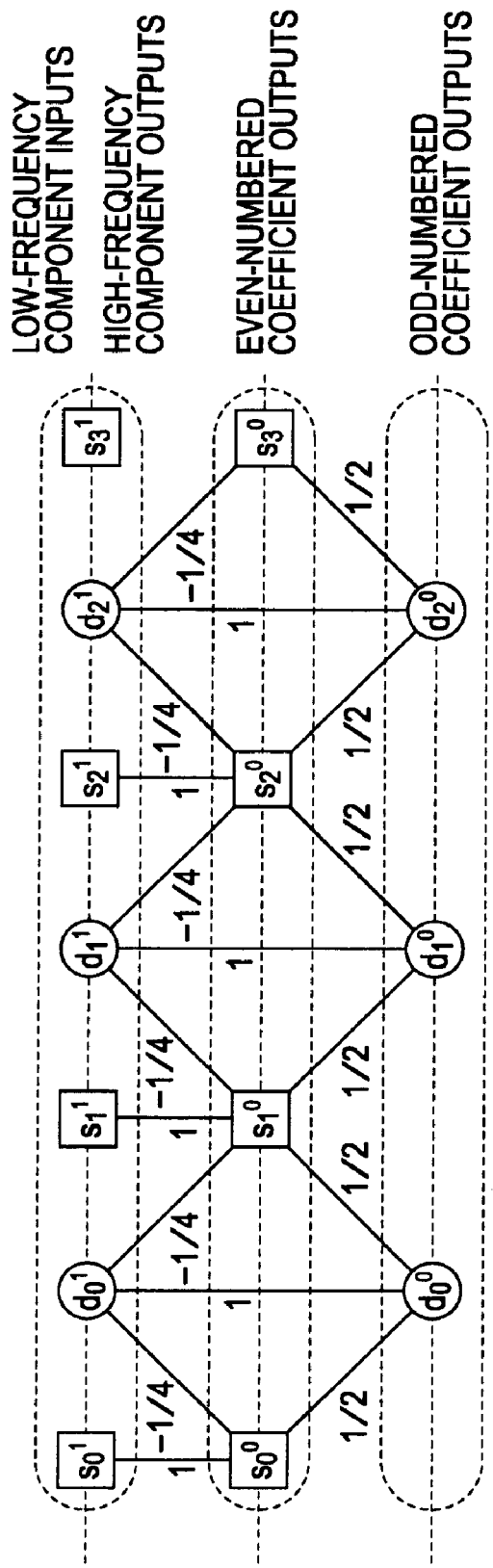
FIG. 16 shows a lifting structure of a 5×3 synthesis filter.

FIG. 16 shows a lifting structure of a 5×3-synthesis filter, which is adopted in the JPEG 2000 standard. Synthesis filtering in which the lifting technique is applied to the 5×3-synthesis filter will be schematically explained with reference to FIG. 16.

Referring to FIG. 16, coefficients generated by wavelet transform are shown in the uppermost row. High-frequency component coefficients are represented as circles, and low-frequency component coefficients are represented as squares.

As the first step, an even-numbered coefficient $s_i^0$ (the first coefficient is regarded as being the 0th coefficient) is generated in accordance with input low-frequency and high-frequency component coefficients, using the following equation:

$$s_i^0 = s_i^1 - \frac{1}{4}(d_{i-1}^1 + d_i^1) \quad (3).$$

Then, as the second step, an odd-numbered coefficient $d_i^0$ is generated in accordance with the even-numbered coefficient $s_i^0$ generated in the first step and the input high-frequency component coefficient $d_i^1$, using the following equation:

$$d_i^0 = d_i^1 - \frac{1}{2}(s_i^0 + s_{i+1}^0) \quad (4).$$

As described above, in synthesis filtering, after an even-numbered coefficient is generated, an odd-numbered coefficient is generated. Two types of filter banks used for such synthesis filtering have two taps although five taps are originally necessary. Thus, the amount of calculation can be significantly reduced.

Fourth Embodiment

An image decoding apparatus according to a fourth embodiment that corresponds to the image encoding apparatus 20 according to the second embodiment will be described.

FIG. 17 schematically shows a configuration of an image decoding apparatus 40 according to the fourth embodiment. Referring to FIG. 17, the image decoding apparatus 40 includes an entropy-decoding unit 41, a dequantization unit 42, and a synthesis filter bank 43.

The entropy-decoding unit 41 performs source decoding of a received encoded code-stream D40, and generates quantized coefficient data D41. As source decoding, Huffman decoding or high-efficiency arithmetic decoding can be used, as described above. In addition, if an image encoding apparatus performs source coding for each P lines, as described above, the entropy-decoding unit 41 also performs source decoding for individual subbands and for each P lines of a subband.

The dequantization unit 42 performs dequantization by multiplying the quantized coefficient data D41 by a quantization step size, and generates coefficient data D42. The quantization step size is normally described in the header of an encoded code-stream. If an image encoding apparatus sets a quantization step size for each line block, as described above, the dequantization unit 42 also performs dequantization by setting a dequantization step size for each line block.

The synthesis filter bank 43 has a configuration similar to the band synthesis apparatus 30 shown in FIG. 15. That is, the synthesis filter bank 43 performs synthesis filtering for the coefficient data D42 to generate an image data stream, inserts a vertical synchronizing signal into the generated image data stream, and outputs a generated video signal D43.

The present invention is not limited to any of the first to fourth embodiments described above. Various changes and modification can be made to the present invention without departing from the spirit and scope of the present invention.

For example, band analysis or band synthesis is performed for a video signal in each of the foregoing embodiments. However, the present invention is also applicable to band analysis or band synthesis of a static image.

Although hardware configurations have been described in the foregoing embodiments, a series of processing may be performed by software. In this case, a program constituting the software may be incorporated in advance in dedicated hardware of a computer, such as a read-only memory (ROM) or a hard disk, or installed from a network or a recording medium on a general-purpose personal computer capable of performing various functions by installing various programs. As the recording medium, for example, a package medium including a magnetic disk (flexible disk), an optical disk, such as compact disk-read only memory (CD-ROM) or a digital versatile disc (DVD), a magnetic optical disk, such as mini-disk (MD) (trademark), or a semiconductor memory can be used.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   horizontal analysis filtering means for receiving image data in units of lines and for generating a low-frequency component and a high-frequency component by performing horizontal low-pass analysis filtering and horizontal high-pass analysis filtering every time a number of samples in a horizontal direction reaches a predetermined value;
   vertical analysis filtering means for generating coefficient data of a plurality of subbands by performing vertical low-pass analysis filtering and vertical high-pass analysis filtering every time a number of lines in a vertical direction of low-frequency and high-frequency components generated by the horizontal analysis filtering means reaches a predetermined value, and
   quantization means for determining an adaptive quantization step size with respect to each line block and for quantizing the coefficient data of the plurality of subbands generated by the vertical analysis filtering means by weights, the weights being chosen such that a weighted quantization step size is smaller for a low-frequency component and is higher for a high-frequency component for each line block, the quantizing generating quantized coefficient data,
   wherein the line block includes a line of a lowest-frequency subband and a plurality of lines of other subbands necessary for generating the line of the lowest-frequency subband.

2. The image processing apparatus according to claim 1, wherein each of the horizontal analysis filtering means and the vertical analysis filtering means hierarchically performs analysis filtering of a lowest-frequency subband.

3. The image processing apparatus according to claim 1, wherein each of the horizontal analysis filtering means and the vertical analysis filtering means performs lifting arithmetic processing of wavelet transform.

4. The image processing apparatus according to claim 1, wherein:
   the image data for each line is obtained by multiplexing a luminance signal and two types of color-difference signals; and
   each of the horizontal analysis filtering means and the vertical analysis filtering means performs analysis filtering using a time difference between the luminance signal and the two types of color-difference signals.

5. The image processing apparatus according to claim 1, further comprising:
   detecting means for detecting an end point of each of a plurality of pictures forming a video signal serving as the image data by detecting a vertical synchronizing signal of the video signal,
   wherein each of the horizontal analysis filtering means and the vertical analysis filtering means performs analysis filtering for each of the plurality of pictures.

6. The image processing apparatus according to claim 1, further comprising:
   encoding means for encoding the quantized coefficient data of the plurality of subbands generated by the quantization means to generate an encoded stream.

7. The image processing apparatus according to claim 6, wherein the encoding means performs entropy coding of the quantized coefficient data generated by the quantization means to generate the encoded stream.

8. The image processing apparatus according to claim 7, wherein:
   the encoding means performs entropy coding of the quantized coefficient data for individual subbands and for each predetermined number of lines whose number does not exceed a number of lines of the line block.

9. The image processing apparatus according to claim 1, wherein the quantization means performs weighting on the quantization step size of the line block so as to correspond to a position of a corresponding subband.

10. The image processing apparatus according to claim 9, wherein the quantization means performs weighting on the quantization step size of the line block such that a smaller quantization step size is set to a lower-frequency subband and that a larger quantization step size is set to a higher-frequency subband.

11. The image processing apparatus according to claim 1, wherein at least one line block includes coefficients of all the subbands of an image area.

12. An image processing method comprising the steps of:
   receiving image data in units of lines and generating a low-frequency component and a high-frequency component by performing horizontal low-pass analysis filtering and horizontal high-pass analysis filtering every time a number of samples in a horizontal direction reaches a predetermined value;
   generating coefficient data of a plurality of subbands by performing vertical low-pass analysis filtering and vertical high-pass analysis filtering every time a number of lines in a vertical direction of generated low-frequency and high-frequency components reaches a predetermined value; and
   determining an adaptive quantization step size with respect to each line block and quantizing the coefficient data of the plurality of subbands generated by said step of generating coefficient data by weights, the weights being chosen such that a weighted quantization step size is smaller for a low-frequency component and is higher for a high-frequency component for each line block, the quantizing generating quantized coefficient data,
   wherein the line block includes a line of a lowest-frequency subband and a plurality of lines of other subbands necessary for generating the line of the lowest-frequency subband.

13. An image processing apparatus comprising:
   input means for inputting coefficient data of a plurality of subbands generated by performing horizontal low-pass and high-pass analysis filtering and vertical low-pass and high-pass analysis filtering of image data;
   decoding means for generating the coefficient data of the plurality of subbands by decoding an encoded stream that is generated by encoding the coefficient data of the plurality of subbands generated by performing the horizontal low-pass and high-pass analysis filtering and the vertical low-pass and high-pass analysis filtering of the input image data;
   vertical synthesis filtering means for generating a low-frequency component and a high-frequency component by performing, every time a number of lines in a vertical direction reaches a predetermined value, vertical low-pass synthesis filtering and vertical high-pass synthesis filtering, of the coefficient data of the plurality of subbands input by the input means;

horizontal synthesis filtering means for synthesizing a predetermined number of subbands by performing horizontal low-pass synthesis filtering and horizontal high-pass synthesis filtering every time a number of samples in a horizontal direction of low-frequency and high-frequency components generated by the vertical synthesis filtering means reaches a predetermined value;

entropy-decoding means for performing entropy decoding of the encoded stream to generate quantized coefficient data of the plurality of subbands; and dequantization means for dequantizing the quantized coefficient data generated by the entropy-decoding means with respect to each line block to generate the dequantized coefficient data of the plurality of subbands, wherein the dequantization means forms line blocks each including a line of a lowest-frequency subband and a plurality of lines of other subbands necessary for generating the line of the lowest-frequency subband, and sets an adaptive quantization step size of each line block, a weighted quantization step size being set smaller for a low-frequency component and being set higher for a high-frequency component for each line block.

14. The image processing apparatus according to claim 13, wherein:
the image data is divided into the plurality of subbands by hierarchically performing analysis filtering of a lowest-frequency subband; and
each of the vertical synthesis filtering means and the horizontal synthesis filtering means hierarchically performs synthesis filtering starting from the predetermined number of subbands including the lowest-frequency subband.

15. The image processing apparatus according to claim 13, wherein each of the vertical synthesis filtering means and the horizontal synthesis filtering means performs lifting arithmetic processing of inverse wavelet transform.

16. The image processing apparatus according to claim 13, further comprising:
vertical synchronizing signal insertion means for generating a video signal including a plurality of pictures and serving as the image data by inserting a vertical synchronizing signal between pictures of a signal generated by the vertical and horizontal synthesis filtering means.

17. An image processing method comprising the steps of:
inputting coefficient data of a plurality of subbands generated by performing horizontal low-pass and high-pass analysis filtering and vertical low-pass and high-pass analysis filtering of image data;
generating the coefficient data of the plurality of subbands by decoding an encoded stream that is generated by encoding the coefficient data of the plurality of subbands generated by performing the horizontal low-pass and high-pass analysis filtering and the vertical low-pass and high-pass analysis filtering of the image data of said step of inputting;
generating a low-frequency component and a high-frequency component by performing, every time a number of lines in a vertical direction reaches a predetermined value, vertical low-pass synthesis filtering and vertical high-pass synthesis filtering of the input coefficient data of the plurality of subbands;
synthesizing a predetermined number of subbands by performing horizontal low-pass synthesis filtering and horizontal high-pass synthesis filtering every time a number of samples in a horizontal direction of generated low-frequency and high-frequency components reaches a predetermined value;

performing entropy decoding of the encoded stream to generate quantized coefficient data of the plurality of subbands; and dequantizing the quantized coefficient data generated by said step of performing entropy decoding with respect to each line block to generate the dequantized coefficient data of the plurality of subbands, wherein the step of dequantizing forms line blocks each including a line of a lowest-frequency subband and a plurality of lines of other subbands necessary for generating the line of the lowest-frequency subband, and sets an adaptive quantization step size of each line block, a weighted quantization step size being set smaller for a low-frequency component and being set higher for a high-frequency component for each line block.

18. An image processing apparatus including a hardware processor, the apparatus comprising:
a horizontal analysis filtering unit operating on the hardware processor that receives image data in units of lines and generates a low-frequency component and a high-frequency component by performing horizontal low-pass analysis filtering and horizontal high-pass analysis filtering every time a number of samples in a horizontal direction reaches a predetermined value;
a vertical analysis filtering unit operating on the hardware processor that generates coefficient data of a plurality of subbands by performing vertical low-pass analysis filtering and vertical high-pass analysis filtering every time a number of lines in a vertical direction of low-frequency and high-frequency components generated by the horizontal analysis filtering unit reaches a predetermined value, and
a quantization unit operating on the hardware processor that determines an adaptive quantization step size with respect to each line block and that quantizes the coefficient data of the plurality of subbands generated by the vertical analysis filtering unit by weights, the weights being chosen such that a weighted quantization step size is smaller for a low-frequency component and is higher for a high-frequency component for each line block, the quantization generating quantized coefficient data,
wherein the line block includes a line of a lowest-frequency subband and a plurality of lines of other subbands necessary for generating the line of the lowest-frequency subband.

19. An image processing apparatus including a hardware processor, the apparatus comprising:
an input unit that inputs coefficient data of a plurality of subbands generated by performing horizontal low-pass and high-pass analysis filtering and vertical low-pass and high-pass analysis filtering of image data;
a decoding unit that generates the coefficient data of the plurality of subbands by decoding an encoded stream that is generated by encoding the coefficient data of the plurality of subbands generated by performing the horizontal low-pass and high-pass analysis filtering and the vertical low-pass and high-pass analysis filtering of the image data from the input unit;
a vertical synthesis filtering unit operating on the hardware processor that generates a low-frequency component and a high-frequency component by performing, every time a number of lines in a vertical direction reaches a predetermined value, vertical low-pass synthesis filtering and vertical high-pass synthesis filtering of the coefficient data of the plurality of subbands input by the input unit;

a horizontal synthesis filtering unit operating on the hardware processor that synthesizes a predetermined number of subbands by performing horizontal low-pass synthesis filtering and horizontal high-pass synthesis filtering every time a number of samples in a horizontal direction of low-frequency and high-frequency components generated by the vertical synthesis filtering unit reaches a predetermined value;

entropy-decoding unit operating on the hardware processor for performing entropy decoding of the encoded stream to generate quantized coefficient data of the plurality of subbands; and dequantization unit for dequantizing the quantized coefficient data generated by the entropy-decoding unit with respect to each line block to generate the dequantized coefficient data of the plurality of subbands, wherein the dequantization unit forms line blocks each including a line of a lowest-frequency subband and a plurality of lines of other subbands necessary for generating the line of the lowest-frequency subband, and sets an adaptive quantization step size of each line block, a weighted quantization step size being set smaller for a low-frequency component and being set higher for a high-frequency component for each line block.

* * * * *